United States Patent [19]

Rodrigues

[11] Patent Number: 5,358,051
[45] Date of Patent: Oct. 25, 1994

[54] METHOD OF WATER CONTROL WITH HYDROXY UNSATURATED CARBONYLS

[75] Inventor: Klein A. Rodrigues, Duncan, Okla.

[73] Assignee: Halliburton Company, Duncan, Okla.

[21] Appl. No.: 141,442

[22] Filed: Oct. 22, 1993

[51] Int. Cl.$^5$ ............................................ E21B 33/138
[52] U.S. Cl. .................... 166/295; 166/294; 523/130
[58] Field of Search .................. 166/294, 295, 300; 405/264; 523/130, 132

[56] References Cited

U.S. PATENT DOCUMENTS

| | | | |
|---|---|---|---|
| 3,175,612 | 3/1965 | Holbert et al. | 166/295 |
| 3,334,689 | 8/1967 | McLaughlin . | |
| 3,490,533 | 1/1970 | McLaughlin | 166/270 |
| 4,168,614 | 9/1979 | Rieuz | 166/295 X |
| 4,637,467 | 1/1987 | Shaw et al. | 166/295 |
| 4,767,550 | 8/1988 | Hanlon et al. | 166/295 X |

OTHER PUBLICATIONS

"Synthetic hydrogels: 1. Hydroxyalkyl acrylate and methacrylate copolymers—water binding studies" by Philip H. Corkhill, et al., *Polymer*, 1987, vol. 28, Sep.
*Encyclopedia of Polymer Science and Engineering*, vol. 7, John Wiley & Sons, New York, pp. 514–516, 531 (1987).
"Treatment of Injection and Producing Wells with Monomer Solution", By H. C. McLaughlin, et al., SPE 5364, Mar. 24–25, 1975.
"*Encyclopedia of Chemical Technology*", vol. 1, 3rd. Edition, John Wiley & Sons, New York, pp. 298–303, 311 (1978).

*Primary Examiner*—George A. Suchfield
*Attorney, Agent, or Firm*—Robert A. Kent

[57] ABSTRACT

A method of forming a gel in the subsurface formation is provided whereby a self crosslinking monomer selected from hydroxy unsaturated carbonyl compounds is polymerized in the formation by a suitable initiator. In a preferred embodiment, the initiator is selected from ago compounds which are temperature activated over a range of temperatures. The method is particularly useful to substantially terminate or at least decrease the flow of water from a subterranean formation into a wellbore penetrating the formation 19 Claims, No Drawings

METHOD OF WATER CONTROL WITH HYDROXY UNSATURATED CARBONYLS

BACKGROUND OF THE INVENTION

1. Technical Field of the Invention

This invention broadly relates to the treatment of a subsurface earth formation which is penetrated by a borehole. The invention further relates to a method of decreasing the rate of flow of water from a subterranean formation into a borehole which penetrates the formation. This invention more specifically pertains to the introduction of a self crosslinking, polymerizable monomer into a water-containing subterranean formation penetrated by a wellbore and causing the monomer to form a gel in the formation.

2. Related Art and Problems Solved

When performing various types of operations below the surface of the earth a problem often encountered which interferes with the operation is the undesirable flow of water from a subsurface formation into a work space or volume which penetrates the formation. Such operations can include, but are not limited to, mining operations, foundation construction, road and bridge construction, oil production and similar operations which require excavation into or penetration of earth structures having permeabilities conducive to the flow of water.

The related problem of terminating, or at least reducing, such undersireable flow of water has been attempted to be solved by various means. The solutions attempted have involved, among other things, pumping unwanted water from the work space, erecting barriers, e.g., a casing, at the interface between the space and the formation to prevent the flow of water from the formation into the work space and decreasing the permeability of the formation itself by introducing a material, e.g., a grout, into the formation.

It is well known that both oil and water are produced during the ordinary recovery of oil from a subterranean formation. If the ratio of water to oil, i.e., the water-oil ratio or WOR, is low, then the produced water can be handled and disposed of in a manner which will not unreasonably reduce the economic benefits derived from the produced oil. In such instances, water control can simply involve pumping the water from the well and storing or otherwise disposing of it in some acceptable fashion. However, if the WOR is so high that the various costs of pumping, handling, storing and disposing of the produced water exceeds the economic benefits of the produced oil, then the well is either abandoned or an alternate water control technique is employed.

One alternate water control method is disclosed by McLaughlin in U.S. Pat. No. 3,334,689, wherein an aqueous solution of a polymerizable composition containing a monoethylenically unsaturated acrylate monomer and a crosslinking agent are injected into the formation producing the water. The monomer and crosslinking agent are caused to form a stable crosslinked gel in the formation to thus reduce the water permeability of the formation and thereby terminate or at least decrease the rate of flow of water from the formation.

McLaughlin, in U.S. Pat. 3,490,533, discloses injecting into a subterranean formation an aqueous solution of a polymerizable monomer having dissolved therein a polymerization catalyst, i.e., an initiator, having a latent period. The monomer polymerizes in the formation after the latent period of the catalyst has expired. McLaughlin describes the product of the polymerization as a viscous polymer solution. In the practice of the invention, McLaughlin discloses the use of monomers having at least one carbon-to-carbon double bond to which can be added a crosslinking monomer, such as a diallyl monomer, if polymer crosslinking is desired. McLaughlin discloses that excess crosslinking monomer causes gelation which creates a plug rather than a desired viscous, but still flowable fluid. In other words, McLaughlin discloses that a plug can be formed in the formation if a crosslinking monomer is combined with his polymerizable monomer. McLaughlin, by way of example, thus discloses that a crosslinked polymer can be produced by polymerizing acrylamide in the presence of methylene bisacrylamide or the crosslinking monomers disclosed in U.S. Pat. No. 3,334,689 referred to above.

It is an object of this invention to produce a crosslinked polymer in a formation without the use of a crosslinking monomer.

SUMMARY DISCLOSURE OF THE INVENTION

By this invention, there is thus provided a method of forming a crosslinked polymer within a subterranean formation by introducing into the formation a polymerizable monomer together with a polymerization initiator, i.e., a catalyst, and permitting said monomer to polymerize and crosslink in the formation in the absence of a specific monomer employed to enable crosslinking. That is, a crosslinking monomer is not required to produce the crosslinked polymer useful in this invention.

The polymerizable monomer of this invention, in broad terms, is a liquid, water soluble, hydroxy unsaturated carbonyl preferably selected from compounds represented by the general formula

(1)

wherein $R_1$ is —O— or

$R_2$ is hydrogen or —$CH_3$, and a is 1 or 2.

Since the monomers useful herein are liquid materials they are conveniently handled by equipment ordinarily employed at a field location. Further, the monomers, being readily soluble in water, eliminate the need for extended dissolution periods. The method of this invention features a one component liquid system, thus the need for complex handling, storage and transporting equipment is eliminated.

The method of this invention of forming a crosslinked polymer in a subterranean formation is very useful as a means of forming a plug or block in the permeable portion of a water producing subterranean formation. The plug will terminate, or at least decrease, the flow of water from the formation into a space, such as a wellbore, which penetrates the formation. By decreasing the production of water from the formation itself, the method of this invention, serves to eliminate the need for extensive surface equipment devoted to the handling, storage and disposal of produced water.

DESCRIPTION OF THE PREFERRED EMBODIMENTS

The monomers employed in the method of this invention are liquid, water soluble materials which, in the presence of a suitable water soluble initiator, will form polymers which will crosslink without the need of a specific material to produce the crosslink. For purposes of this invention, the monomers employed herein are referred to as self crosslinking monomers and the produced products are referred to as gels. A gel is defined herein as a cross-linked polymer network swollen in a liquid medium.

For functional purposes of this invention, a polymer is a viscous fluid which will flow under stress as contrasted with a gel which is a fluid which will not flow.

Water solutions of the self crosslinking monomers useful herein, prior to reaction, exhibit very low viscosities and readily flow in pipe ordinarily employed in wellbores and will also readily flow into the permeable portions of a subterranean formation. However, when the self crosslinking monomers useful herein react, gels are formed, some of which are referred to as rigid gels and some of which are referred to as soft gels.

A "rigid gel," as defined herein, is a gel, as previously defined, which will not release water bound within the crosslinked polymer network upon application of moderate pressure. In contrast, a "soft gel," as defined herein, includes water which is not bound in the network by molecular interaction as strong as that in a rigid gel. Accordingly, a soft gel is like a sponge in that it will release water bound within the crosslinked polymer network upon application of slight pressure.

The concept of "rigid gels" and "soft gels" is more rigorously discussed by Corkhill, et al., in "Synthetic hydrogels: 1. Hydroxyalkyl acrylate and methacrylate copolymers—water binding studies", Vol. 28, *Polymer*, September 1987 at 1758 et seq.

As far as usefulness in this invention is concerned, a monomer of this invention which produces a rigid gel will form a plug in a formation which will substantially terminate the flow of water through the formation. Whereas a monomer of this invention which produces a soft gel will form a plug in a formation which will decrease the flow of water through the formation.

According to a method of this invention, a gel is formed in a formation penetrated by a borehole as follows. The location in the formation where the gel is to be formed is first identified by known means, such as by logging. In the case of a wellbore penetrating a subsurface formation containing a zone which produces water, the flow of which is desired to be terminated or decreased, the zone is isolated by known means and then an aqueous solution containing the polymerizable monomer of this invention, as set out in formula (1), above, is injected into the formation by way of the wellbore. The quantity of solution injected is based upon the depth of penetration desired, the volume of the zone to be treated and the permeability and other physical properties of the material in the zone. It is, of course, desirable that the pressure employed to inject the solution not be high enough to create a fracture in the zone or to damage equipment in the wellbore. Pumping pressures and formation fracturing are well known problems and beyond the scope of this invention.

After the solution is in place in the zone, the polymerizable monomer is permitted to form a gel therein prior to conducting further operations in the wellbore. The time required to form the gel, as will be further discussed below, can be controlled to be in the range of from about one half hour to several days.

The polymerizable monomer of this invention, which is a liquid, water soluble, hydroxy unsaturated carbonyl, as set out in formula (1), above, can be injected into the formation in undiluted form together with a suitable water soluble polymerization initiator. However, it is more convenient, and thus preferred, to first dissolve the monomer in water to form an aqueous solution and then to inject the monomer solution together with the initiator into the desired zone by way of the wellbore.

The monomer solution is broadly comprised of water and the hydroxy unsaturated carbonyl of this invention. Prior to introduction of the solution into the formation, it is mixed with a suitable water soluble polymerization initiator. Since polymerization ordinarily begins immediately upon mixing the monomer and initiator, mixing is preferably delayed until the monomer solution is introduced into the wellbore at the surface of the earth.

Furthermore, since polymerization causes an increase in viscosity of the solution, and since the viscosity of the solution containing the initiator must be low enough to permit penetration into the desired zone, it may be necessary to cause a delay in polymerization in order to delay an increase in viscosity. Delaying the onset of polymerization is particularly important if there is an extended period of time between mixing initiator and solution and placing all of the required monomer into the desired zone. Accordingly, a delay in polymerization can be obtained by mixing with the monomer solution, along with the initiator, a quantity of material, referred to herein as a scavenger, which will react with the initiator to thereby prevent the initiator from reacting with the monomer. Polymerization will not commence until all of the scavenger is consumed by reaction.

In more technical terms, initiators employed herein form free radicals which in turn initiate polymerization. Accordingly, any material which will react with the free radical before the free radical can initiate polymerization is referred to as a free radical scavenger or simply as a scavenger. Scavengers include naturally and accidentally occurring ingredients, such as oxygen, as well as materials deliberately added to the reaction mass to delay polymerization.

The aqueous solution containing the polymerizable monomer can also contain a clay control agent, such as potassium chloride, which will not interfere with the polymerization, but which will help prevent formation damage which can be caused by water different from formation water which contacts clay in the formation. It has been observed that the water used to dissolve the polymerizable monomer can contain in the range of from about 2 to about 4 pounds potassium chloride per 98 pounds of water.

The pH of the aqueous solution containing the polymerizable monomer should preferably be adjusted to a value in the range of from about 4.5 to about 6.5 prior to addition of initiator. It has been observed that an aqueous solution of ammonium acetate and acetic acid is useful to adjust pH to a value within the desired range.

As previously mentioned, the polymerizable monomer useful herein to form a gel in the absence of a specific crosslinking agent is a liquid, water soluble, hydroxy unsaturated carbonyl selected from compounds represented by formula (1), above. The self-crosslinking compounds within the scope of formula (1) preferred for use herein are N-hydroxymethylacrylamide (HMAA), hydroxyethylacrylate (HEA), hydroxyethylmethacrylate (HEMA) and N-hydroxymethylmethacrylamide (HMMAA). The most preferred such carbonyl for use herein is hydroxyethylacrylate (HEA).

"Other liquid, water soluble hydroxy unsaturated carbonyls useful herein include those which have been ethoxylated or propoxylated with up to 20 ethoxy or propoxy groups. Examples of such compounds include polyethylene and polypropylene glycol acrylate and methacrylate."

The minimum quantity of carbonyl required to produce a gel useful herein to form a plug in a formation is present in aqueous solution in an amount of about 2 pounds per 100 pounds of aqueous solution. Satisfactory results can be obtained if said carbonyl is present in an amount in the range of from about 5 to about 20 and preferably from about 10 to about 15 pounds of carbonyl per 100 pounds of aqueous solution.

The ability of the carbonyl of this invention to form a gel plug in a subsurface formation which will terminate, or substantially terminate, the flow of water through the formation is, to some extent, dependent upon the concentration of carbonyl in the aqueous solution and the temperature of the zone in which the gel is to form. Accordingly, it is most preferred that the amount of carbonyl to be employed shall be about 10 pounds per 100 pounds of solution at temperatures of about 100° F. and lower and about 15 pounds per 100 pounds of solution at temperatures of about 150° F. and higher. At temperatures between 100° F. and 150° F. it is believed that satisfactory results can be obtained by increasing the amount of carbonyl by 1 pound per 100 pounds of solution per each 10° F. increase in temperature.

The self-crosslinking compounds useful in this invention can be mixed with compounds which are known to form polymers when initiated by free radical initiators such as those useful herein. This combination of compounds also produces gels in the absence of crosslinking monomer.

The compounds which can be mixed with the self-crosslinking compounds useful herein include, but are not limited to, acrylic acid, methacrylic acid, acrylamide, methacrylamide, N,N-dimethylacrylamide and 2-acrylamido-2-methylpropane sulfonic acid.

The polymerization initiator employed herein can be any suitable water soluble compound or compounds which form free radicals in aqueous solution. Such compounds include, but are not limited to, alkali metal persulfates, such as, sodium persulfate, potassium persulfate and ammonium persulfate; peroxides, such as hydrogen peroxide and tertiary-butyl hydroperoxide; oxidation-reduction systems employing reducing agents, such as, bisulfite, sulfite, thiosulfate and metabisulfite in combination with oxidizers such as silver(I), copper (I), Iron-(III), chlorite and hydrogen peroxide. Azo polymerization initiators are also useful herein and are preferred as shall be discussed below.

The alkali metal persulfates and the peroxides, referred to above, form free radicals in several ways. In one way, these compounds form free radicals upon being exposed to heat, that is, they are temperature activated. Upon being activated at a certain temperature, half of the molar amount of the compound decomposes to form free radicals within a set period of time. This is called the half-life of the initiator. The process of decomposition continues at an exponentially declining rate until polymerization is initiated. The polymerization reaction produces heat, therefore, the rate of decomposition rapidly increases and increases the rate of gelation. If all of the polymerizable material is gelled before it can be placed in the desired location, then, for purposes of this invention, the result is referred to as pre-mature gelation.

It is to be understood that compounds which produce free radicals upon exposure to heat will produce free radicals at all temperatures, therefore, for purposes of this invention, the term activation temperature means that temperature at which half the molar amount of a compound will convert to free radicals in a period of 10 hours. The activation temperature of the said persulfates is approximately 142° F.

The persulfates and peroxides can also be activated to produce free radicals by reaction with an amine or a metal ion, such as ferrous ion, in an oxidation-reduction (redox) system. Examples of amine compounds and metal compounds useful in such redox systems include triethanol amine, tetraethylene penta amine, ferrous ion and the like. As with free radical generation by temperature activation, generation of free radicals by redox system can also result in premature gelation.

The quantity of initiator employed is an amount in the range of from about 0.001 to about 2.0, preferably 0.01 to about 1 and still more preferably from about 0.05 to about 0.5 percent initiator by weight of monomer solution.

It has been mentioned that all of the monomer solution should be injected into the desired location in the formation before the solution experiences an increase in viscosity. Accordingly, to delay polymerization and the consequent increase in solution viscosity, polymerization is retarded by combining with the monomer solution and initiating system a quantity of free radical scavenger in amount sufficient to preferentially react with free radicals produced by the initiator to prevent premature gelation. It is believed that polymerization should be delayed to provide a placement, or pumping, time of about four to six hours. This length of time can be provided by a quantity of scavenger in an amount in the range of from 0 to about 1 mole per mole of initiator employed. Free radical scavengers which can be used herein are potassium ferricyanide, hydroquinone and monomethyl ether of hydroquinone.

The preferred scavenger is potassium ferricyanide.

If the activation temperature is greater than the temperature of the formation into which the monomer is placed, then oxidation-reduction initiation must be employed which may require the use of a scavenger to prevent premature gelation. In the situation where the activation temperature and formation temperature are substantially the same such that intentional oxidation-reduction initiation is apparently not required, the use of an unknown quantity of scavenger may nevertheless be required because of the possibility of unintended oxidation reduction initiation.

The initiators mentioned above, as disclosed, can be activated by temperature and oxidation-reduction reactions (or both) neither of which is necessarily satisfactory in situations where unintended oxidation reduction can occur. In this regard, it is noted that ferrous ion, for example, can be a reductant in the redox systems of persulfate or peroxide initiators. Since ferrous ion is probably to be found in steel conduits employed in monomer solution placement, then the probability of premature gelation should be anticipated. It has accordingly been the practice to clean or otherwise treat such conduits to minimize the dissolution of ferrous ion before placing the monomer solution therein in an attempt to avoid premature gelation.

In view of the above problems, a free radical polymerization initiator is required which is temperature activated at various temperatures and which is not activated by any oxidation reduction mechanism. Such a free radical initiator is provided by the azo compounds defined in formula (2) below.

$$Z-N=N-B \qquad (2)$$

wherein:
Z is

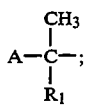

B is Z or $R_2$;
$R_1$ is $-CH_3$ or $-C\equiv N$;
A is

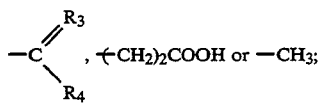

$R_2$ is

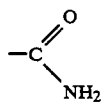

$R_3$ is $=N-$, $=NH$ or $=O$; and
$R_4$ is

$-NH_2$, $-NH(CH_2)_2OH$, $-NHC(CH_2OH)_2CH_3$ or $-NHC(CH_2OH)_3$;
when $R_3$ is $=N-$, then $R_4$ is

and
when B is $R_2$, then $R_1$ is $-C\equiv N$ and A is $-CH_3$.

The azo polymerization initiators within the scope of formula (2) which are preferred for use herein are defined by the formula $$Z-N=N-Z \qquad (3)$$

and are commercially available from WAKO Pure Chemical Industries, Ltd. These azo initiators have activation temperatures ranging from about 111° F. to about 190° F. Accordingly, by determining the temperature of the formation into which the monomer solution is to be placed, a compound within the scope of formula (2) above can be selected for polymerization initiation which has an activation temperature equal to or slightly less than the temperature of the formation. Furthermore, since the compounds within the scope of formula (2) are not activated by oxidation reduction mechanism, the need for a scavenger is eliminated.

The most preferred azo compounds for use herein, all of which are within the scope of formula (3), are 2,2'-Azobis(N,N'-dimethylene isobutyramidine)dihydrochloride, referred to herein as initiator I-44; 2,2'-Azobis(2-amidinopropane)dihydrochloride, referred to herein as initiator I-50; and 2,2'-Azobis[2-methyl-N-(2-hydroxethyl)propionamide], referred to herein as initiator I-86.

The activation temperatures of initiators I-44, I-50 and I-86 are 111° F., 133° F. and 187° F. respectively.

The quantity of azo initiator employed is an amount in the range of from about 0.001 to about 2.0, preferably 0.01 to about 1 and still more preferably from about 0.05 to about 0.5 percent initiator by weight of monomer solution.

It is noted that the azo initiators can be employed with free radical scavengers, such as those named above, if desired. The quantity of scavenger to be used is the same as mentioned previously.

In a preferred embodiment of this invention, the monomer solution employs the monomer hydroxyethylacrylate (HEA) and any one of the initiators I-44, I-50 and I-86.

The following examples are provided to further illustrate the invention and should not be construed to unduly limit the scope thereof.

EXAMPLE I

Compounds were polymerized and crosslinked to determine the nature of the reaction product. In some instances the polymerization was conducted in the presence of a crosslinking agent. In other instances the polymerization was conducted in the absence of a crosslinking agent.

The polymerization was conducted by dissolving the compound in a quantity of deionized water in the presence of a crosslinking agent, if used. After the solution was purged with nitrogen to remove oxygen, the solution was placed in a water bath maintained at 60° C. and reaction was commenced upon addition of an initiator.

The crosslinking agent employed was methylene-bisacrylamide (MBA) in an amount of about 0.25 to 1.0 grams.

The initiator employed consisted of 0.4 milliliters of a 10 percent by weight aqueous solution of sodium persulfate and 0.03 milliliters of tetraethylenepentamine.

The compounds polymerized are identified in Table I below. The test results are provided in Table II below.

TABLE I

| Compound Name | Abbreviation |
|---|---|
| N-hydroxymethylacrylamide | HMAA |
| hydroxyethylmethacrylate | HEMA |
| hydroxyethylacrylate | HEA |
| N-hydroxymethylmethacrylamide | HMMAA |
| hydroxy propylmethacrylate | HPMA |
| acrylic acid | A |
| methacrylic acid | MA |
| acrylamide | AA |

TABLE II

| Run No. | Compound, | Grams | MBA, Grams | Water, Grams | Result |
|---|---|---|---|---|---|
| 1 | HMAA | 5 | 0 | 45 | Rigid gel |
| 2 | HEA | 5 | 0 | 45 | Rigid gel |
| 3 | HMMAA | 10 | 0 | 40 | Rigid gel |
| 4 | HEMA | 5 | 0 | 45 | soft gel |
| 5 | HPMA | 5 | 0 | 45 | soft gel |
| 6 | A | 5 | 0.25 | 45 | Rigid gel |
| 7 | MA | 5 | 0.25 | 45 | Rigid gel |
| 8 | AA | 5 | 0 | 45 | viscous solution |
| 9 | AA | 5 | 0.25 | 45 | Rigid gel |
| 10 | HEMA +A | 2.5 2.5 | 0 | 45 | soft gel |
| 11 | HEMA | 5 | 0.25 | 45 | soft gel |
| 12 | HEA +AA | 1 4 | 0 | 45 | Rigid gel |
| 13 | A | 5 | 0 | 45 | viscous solution |

Referring to Table II, above, Runs 1, 2, 3, and 4 represent results obtained employing compounds useful in the method of this invention. Runs 5–9, 11 and 13, do not represent results obtained employing compounds and/or systems useful in the method of this invention. Runs 10 and 12 represent results obtained employing systems which can be used in the method of this invention.

The compound employed in Run 5 is a liquid hydroxy unsaturated carbonyl but it is not completely water soluble and is accordingly not considered to be useful in the method of this invention.

Runs 6 and 7 represent results obtained employing the teaching of McLaughlin '689 wherein a rigid gel is obtained if a crosslinking agent is employed.

Runs 8 and 9 represent results obtained employing the teaching of McLaughlin '533 wherein a rigid gel is obtained if a crosslinking agent is employed (Run 9) but a viscous solution is obtained if a crosslinking agent is not employed (Run 8).

Runs 2, 8, 9 and 12 should be compared to note that a compound within the scope of this invention (HEA) will produce a rigid gel in the absence of a crosslinking agent even when combined with an excess of a compound which will not produce a rigid gel in the absence of a crosslinking agent (Run 12).

Runs 4, 10 and 11 demonstrate that the results obtained with a compound within the scope of this invention (HEMA) are not improved by combination with a crosslinking agent or with a compound not within the scope of this invention. However, as seen when comparing Runs 10 and 13, a combination of a compound within the scope of this invention with a compound which is not within the scope of the invention can improve the results obtained by the latter compound.

EXAMPLE II

Tests were performed to determine the time required for a hydroxy unsaturated carbonyl to form a gel, i.e., gel time. The tests were conducted at temperatures in the range of from 90° F. to 150° F. The hydroxy unsaturated carbonyl employed in the tests was hydroxyethylacrylate (HEA) in a water solution. The initiator employed in the tests was the dihydrochloride salt of the diazo compound, 2,2'-Azobis(2-amidinopropane) in a 10 percent by weight water solution. For convenience, the initiator employed is referred to herein as initiator I-50.

In some of the tests, a 1 percent by weight aqueous solution of potassium ferricyanide, $K_3Fe(CN)_6$, (referred to herein for convenience as KF), a free radical scavenger, was employed to delay the initiation of the polymerization reaction to thereby increase gel time.

Each of tests 1–6 employed 200 grams of a 10 percent by weight water solution of HEA, the recipe of which is set out below.

| | |
|---|---|
| Duncan, Oklahoma, tap water | 176.4 grams |
| Potassium Chloride | 3.6 grams |
| HEA | 20.0 grams |

Each of tests 7–9 employed 200 grams of a 12 percent by weight water solution of HEA, the recipe of which is set out below.

| | |
|---|---|
| Duncan, Oklahoma, tap water | 172.4 grams |
| Potassium Chloride | 3.6 grams |
| HEA | 24.0 grams |

The pH of each one of the above 200 gram solutions was adjusted to a value of about 5.8 by addition thereto of about 0.1 milliliters of a solution of ammonium acetate and acetic acid; a quantity of KF, if used, was also added to the solution. Thereafter, I-50 was added to initiate reaction and then the test solution was brought to the test temperature.

The test results are set out in Tables IIIA–IIID, below.

TABLE III, A

Gel Time, minutes, at various test temperatures, °F., 200 grams 10% aqueous solution HEA 1 ml, 10% aqueous solution I-50
Gel Time, minutes at X° F.

| KF ml | 90 | 100 | 110 | 120 #3 | 130 #4 | 140 #5 | 150 #6 |
|---|---|---|---|---|---|---|---|
| 0 | | | | | | | |
| 1 | | | | | | | |
| 2 | | | | 577 | 283 | | |
| 3 | | | | 902 | | | 97 |
| 4 | | | | <1316 | 434 | 195 | |
| 5 | | | | | | | |
| 6 | | | | | <1440 | 265 | <188 |
| 7 | | | | | | | |
| 8 | | | | | * | 403 | 190 |
| 9.5 | | | | | | | <370 |
| 10 | | | | | | * | |

*a gel did not form in 24 hours

TABLE III, B

Gel Time, minutes, at various test temperatures, °F., 200 grams 12% aqueous solution HEA 1 ml, 10% aqueous solution I-50
Gel Time, minutes at X° F.

| KF ml | 90 | 100 | 110 | 120 | 130 #8 | 140 | 150 #9 |
|---|---|---|---|---|---|---|---|
| 0 | | | | | | | |
| 1 | | | | | | | |
| 2 | | | | | 255 | | |
| 3 | | | | | 447 | | 101 |
| 4 | | | | | 1156 | | |
| 7 | | | | | | | 156 |
| 8 | | | | | 1474 | | |
| 9.5 | | | | | | | |
| 10 | | | | | | | 260 |

TABLE III, C

Gel Time, minutes, at various test temperatures, °F., 200 grams 12% aqueous solution HEA 2 ml, 10% aqueous solution I-50
Gel Time, minutes at X° F.

| KF ml | 90 | 100 | 110 #7 | 120 | 130 | 140 | 150 |
|---|---|---|---|---|---|---|---|
| 0 | | | | | | | |
| 1 | | | 473 | | | | |
| 2 | | | 577 | | | | |
| 3 | | | 756 | | | | |
| 4 | | | 1783 | | | | |
| 5 | | | | | | | |
| 6 | | | | | | | |
| 7 | | | | | | | |
| 8 | | | | | | | |
| 9.5 | | | | | | | |
| 10 | | | | | | | |

TABLE III, D

Gel Time, minutes, at various test temperatures, °F., 200 grams 10% aqueous solution HEA 4 ml, 10% aqueous solution I-50
Gel Time, minutes at X° F.

| KF ml | 90 #1 | 100 #2 | 110 | 120 | 130 | 140 | 150 |
|---|---|---|---|---|---|---|---|
| 0 | 437 | | | | | | |
| 1 | 1370 | 631 | | | | | |
| 2 | 1896 | 848 | | | | | |
| 3 | 3824 | 1194 | | | | | |
| 4 | | * | | | | | |
| 5 | | | | | | | |
| 6 | | | | | | | |
| 7 | | | | | | | |
| 8 | | | | | | | |
| 9.5 | | | | | | | |
| 10 | | | | | | | |

*a gel did not form in 24 hours

From Table III, above, it is evident that at any given test temperature, gel time, for a particular HEA solution, increases with increasing concentration of KF scavenger. It is further indicated in Table III that an increase in temperature produces a decrease in gel time at constant concentration of HEA solution, KF scavenger and initiator.

The data presented in Table III clearly shows that gel time, at a given scavenger level, decreases by a factor in the range of from about 2 to about 3.2 for each 10° F. increase in temperature for temperatures in the test range of from 90° F. to 150° F. The average factor decrease in gel time was about 2.4 for each 10° F. increase in temperature. The mean factor decrease in gel time was about 2.2 for each 10° F. increase in temperature.

EXAMPLE III

Tests were performed to determine the ability of a hydroxy unsaturated carbonyl to form a plug in a subterranean formation. In a typical test, approximately 10 pore volumes of an aqueous solution of hydroxyethylacrylate (HEA) are introduced into a Berea Sandstone Core and allowed to form a gel therein. After the gel is formed the ability of water to flow through the gel-containing core is determined.

The test procedure is as follows.

API brine is passed through a Berea Core of known dimensions under constant pressure differential and at a specified temperature until a constant flow rate is obtained. The flow of brine is simulated from the formation side of the core to the wellbore side of the core. This is referred to as production direction. The data recorded is employed to calculate initial permeability.

An aqueous solution of HEA is then injected into the core at the specified temperature. Approximately 10 pore volumes of solution are passed through the core from the wellbore side of the core to the formation side of the core. This is referred to as treatment direction.

The core containing the solution of HEA is then placed in a bottle together with a quantity of the injected HEA solution. The bottle is completely filled with the core and the HEA solution so that there is no air space. The bottle is sealed and then placed in a water bath maintained at the specified temperature. The bottle remains in the bath for about one day to permit a gel to form in the core.

The core is then removed from the bottle and API brine is passed through the core in the production direction under a constant differential pressure and at the specified temperature until a constant flow rate is obtained. The data recorded is employed to calculate final permeability.

The initial permeability and the final permeability are compared to determine the effectiveness of the tested HEA solution to form a gel which will stop or at least decrease the flow of water through the core. The ratio of the final permeability, Kf, to the initial permeability Ki indicates the effectiveness of the HEA solution, wherein a ratio of less than 1 (100%) indicates the formation of a gel in the core.

A more specific description of the apparatus employed and the method of operating the apparatus is provided in U.S. Pat. No. 4,097,904.

The content of each HEA solution tested is set out in Table IV, below.

The test results are set out in Table V, below.

TABLE IV

| Ingredient[1] | FORMULATION[8] | | | | | | | |
|---|---|---|---|---|---|---|---|---|
| | $10_1$ | $10_2$ | $12.7_3$ | $15_4$ | $15_5$ | $10_6$ | $12_7$ | $14_8$ |
| Duncan, OK, Tap Water | 443.8 | 443.8 | 427.8 | 416.8 | 416.8 | 443.8 | 431.3 | 421.6 |
| KCl[2] | 9.0 | 9.0 | 8.6 | 8.3 | 8.3 | 9.0 | 8.6 | 8.4 |
| HEA | 50.3 | 50.3 | 63.6 | 75 | 75 | 50.3 | 60.0 | 70.0 |
| initiator | $10^5$ | $3^5$ | $2.5^5$ | $2.5^5$ | $12^6$ | $2.5^5$ | $2.5^5$ | $2.5^5$ |
| Scavenger[3] | 0 | 15 | 17.5 | 17.5 | 0 | 15 | 0 | 10 |
| pH adjusting[4] material | 0.1 | 0.1 | 0.1 | 0.1 | 0.1 | 0.1 | 0.1 | 0.1 |

TABLE IV-continued

| Ingredient[1] | FORMULATION[8] | | | | | | | |
|---|---|---|---|---|---|---|---|---|
| | 10[1] | 10[2] | 12.7[3] | 15[4] | 15[5] | 10[6] | 12[7] | 14[8] |
| MBA[7] | 0 | 0 | 0 | 0 | 0 | 2.5 | 0 | 0 |

Notes:
[1]All quantities of water, KCl, MBA and HEA are in grams. All quantities of initiator, scavenger and pH adjusting material are in milliliters.
[2]potassium chloride
[3]potassium ferricyanide, $K_3Fe(CN)_6$, 1 percent by weight aqueous solution
[4]pH adjusted to a value of 5.8 by addition of a solution of ammonium acetate and acetic acid
[5]10 percent by weight aqueous solution of the dihydrochloride salt of 2,2'-Azobis(2-amidinopropane), i.e., initiator I-50
[6]3.2 percent by weight aqueous solution of 2,2'-Azobis[2-methyl-N-(2-hydroxyethyl)propionamide], i.e., initiator I-86
[7]Methylene-bis-acrylamide, a crosslinking agent
[8]Formulations 1, 2 and 6 are 10 wt percent solutions of HEA. Formulation 7 is a 12 wt percent solutions of HEA. Formulation 3 is a 12.7 wt percent solution of HEA. Formulation 8 is a 14 wt percent solution of HEA. Formulations 4 and 5 are 15 wt percent solutions of HEA.

TABLE V

| Data | TEST # | | | | | | | |
|---|---|---|---|---|---|---|---|---|
| | 1 | 2 | 3 | 4 | 5 | 6 | 7 | 8 |
| Core Size, cm | 7.15 | 7.18 | 7.18 | 7.18 | 7.18 | 7.18 | 7.19 | 7.14 |
| L & D | *2.38 | *2.38 | *2.38 | *2.38 | *2.38 | *2.38 | *2.38 | *2.38 |
| Test Temp, °F. | 100 | 150 | 150 | 150 | 150 | 150 | 120 | 135 |
| Formulation | 1 | 2 | 3 | 4 | 5 | 6 | 7 | 8 |
| % HEA | 10 | 10 | 12.7 | 15 | 15 | 10 | 12 | 14 |
| ml | 100 | 100 | 100 | 100 | 100 | 100 | 100 | 100 |
| initial brine flow diff pressure, psi | 50 | 70 | 40 | 30 | 30 | 40 | 30 | 40 |
| flow rate, ml/min | 12.3 | 9.2 | 13.17 | 14.58 | 12.55 | 15.0 | 10.1 | 13.03 |
| Ki permeability, md | 81.4 | 39.8 | 99.2 | 145.6 | 124.6 | 110.0 | 101.3 | 96.1 |
| finial brine flow diff pressure, psi | 2000 | 70 | 40 | 200 | 1700 | 300 | 1700 | 1700 |
| flow rate, ml/min | 0 | 9.2 | 0.05 | 0.33 | 0 | 0.8 | 0.006 | 3.99 |
| Kf permeability, md | <0.001 | 39.8 | 0.37 | 0.49 | <0.001 | 0.78 | 0.001 | 0.69 |
| Kf/Ki, % | ~0 | 100 | 0.37 | 0.34 | ~0 | 0.71 | ~0 | 0.72 |

Referring to the results shown in Tables IV and V, above, it is evident that a 10% solution of HEA (Tests 1, 2 and 6) provide excellent results at 100° F. (Test 1), but unacceptable results at 150° F. (Test 2). However, the results achieved at 150° F. with a 10% solution of HEA can be significantly improved to provide acceptable results by including a quantity of crosslinking material in the polymerization reaction (Test 6).

Acceptable results also can be achieved at 150° F. by increasing the concentration of HEA instead of adding a crosslinking material. In this regard, note Tests 1, 3, and 4, wherein acceptable results can be maintained by increasing the concentration of HEA from 10 percent by weight to 15 percent by weight as the test temperature increases from 100° F. to 150° F. This amounts to an average of about 1 wt percent increase in concentration of HEA per each 10° F. increase in test temperature.

The relationship between increasing the concentration of HEA so as to maintain an acceptable permeability alteration as temperature increases is also evident by comparing Tests 1, 7, and 8.

Comparing the results from Test 5 with the results from Test 4 shows that excellent permeability reduction can be obtained by changing the specific azo initiator employed. Notice that each of Tests 4 and 5 employs a 15% concentration of HEA and that each test is conducted at 150° F. The polymerization initiator employed is different.

EXAMPLE IV

Tests were conducted using different types, concentrations and quantities of thermally activated azo compounds to initiate the polymerization of a hydroxy unsaturated carbonyl to determine the time required to form a gel, i.e., gel time.

The tests were performed at different temperatures wherein the concentration of hydroxy unsaturated carbonyl, in a water solution thereof, was dependent upon the test temperatures. Accordingly, at test temperatures of 100° F. and lower the concentration was 10 percent by weight of solution; at test temperatures of 150° F. and higher the concentration was 15 percent by weight of solution. At test temperatures between 100° F. and 150° F. the concentration of carbonyl was increased by 1 weight percent for each 10° F. increase in temperature. Each test solution weighed 200 grams.

In view of the above, the recipe of each test solution is set out below.

| | Test Temp., °F. | | | | |
|---|---|---|---|---|---|
| | ≦100° | 120° | 130° | 140° | ≧150° |
| Duncan, OK., Tap Water, grams | 176.4 | 174.44 | 173.46 | 172.48 | 171.5 |
| KCl, grams | 3.6 | 3.56 | 3.54 | 3.52 | 3.5 |
| HEA* | 20.0 | 22.0 | 23.0 | 24.0 | 25.0 |

-continued

| | Test Temp., °F. | | | |
|---|---|---|---|---|
| ≦100° | 120° | 130° | 140° | ≧150° |
| 200 | 200 | 200 | 200 | 200 |

*HEA is hydroxyethylacrylate, a liquid, water soluble hydroxy unsaturated carbonyl.

The pH of each test solution was adjusted to a value of about 5.8 by addition thereto of about 0.1 milliliters of a solution of ammonium acetate and acetic acid. A scavenger was not employed.

The azo compound is added to initiate reaction and then the test solution is brought to test temperature and thermally activated.

The azo compounds employed are: 2,2'-Azobis(N,N'-dimethyleneisobutyramidine) dihydrochloride, referred to herein as initiator I-44; 2,2'-Azobis(2-amidinopropane)dihydrochloride, referred to herein as initiator I-50; and 2,2'-Azobis[2-methyl-N-(2-hydroxyethyl propionamide], referred to herein as initiator I-86.

Initiator I-44 was employed at test temperatures of 100° F. and lower in a 10 percent by weight aqueous solution.

Initiator I-50 was employed at test temperatures of 100° F. to 140° F. in a 10 percent by weight aqueous solution (100° F.) and in a 1 percent by weight aqueous solution (120° F.–140° F.).

Initiator I-86 was employed at test temperatures of 150° F. and higher in a 3.2 percent by weight aqueous solution.

The test results are set out in Table VI, below, which relates gel time in minutes, to initiator quantity under various conditions of temperature and initiator concentration.

seen to be the case regardless of the type of initiator, the test temperature or the initiator concentration.

It can also be seen for a given initiator type, volume and concentration that gel time decreases as test temperature increases.

It can be still further seen that the type of initiator employed, as well as the concentration thereof, produces a change in gel time with respect to a given volume of initiator. Accordingly, for a given volume of initiator, at constant concentration I-44 produces shorter gel times at lower temperatures than do either I-50 or I-86, while I-86 produces longer gel times at higher temperatures than do either I-44 or I-50.

In view of Table VI, it can be seen that gel time at a given temperature can be adjusted by alternation in initiator type, concentration and/or volume. This enables selection of a gel time to suit the prevailing temperature condition.

In this reaction, it is seen that initiator I-44 produces gel times in the range of from about three quarters of an hour to about five hours at temperatures of 100° F. and lower. It is also seen that initiator I-50 produces gel times in the range of from about one hour to about 21 hours and up to more than 72 hours at temperatures in the range of from about 100° F. to about 140° F. It is still further seen that initiator I-86 produces gel times in the range of from about one half hour to about 21 hours and up to more than 120 hours at temperatures in the range of from about 150° F. to about 200° F.

Having described the invention that which is claimed is:

1. A method of decreasing the rate of flow of water from a subterranean formation into a wellbore penetrating said formation, said method being comprised of the steps of

TABLE VI

| | Gel Time | | | | | | | | | | | | | |
|---|---|---|---|---|---|---|---|---|---|---|---|---|---|---|
| Type: | I-44 | | | I-50 | | | | | I-86 | | | | | |
| Concentration: wt % | 10 | 10 | 10 | 10 | 1 | 1 | 1 | 1 | 3.2 | 3.2 | 3.2 | 3.2 | 3.2 | 3.2 |
| Test Temperature: °F. | 80 | 90 | 100 | 100 | 120 | 120 | 130 | 140 | 150 | 160 | 170 | 180 | 200 | 200 |
| Time: min | t | t | t | t | t | t | t | t | t | t | t | t | t | t |
| Volume: ml[1] | | | | | | | | | | | | | | |
| 0.5 | | | | * | | | | | | | | | | ** |
| 1.0 | | 227 | 1272 | | | | | * | * | | | * | * | ** |
| 1.5 | | | 711 | | | | | | | | | | | |
| 2 | 305 | 129 | 560 | * | ** | * | * | | | | | * | 93 | 148 |
| 2.5 | | | | * | | | | | | | | | | |
| 3 | | | | | | * | 276 | * | | | | 316 | 54 | |
| 4 | 305 | 165 | 70 | 225 | * | ** | 286 | 127 | | | | 296 | 45 | |
| 5 | | | | | | 210 | 102 | * | | | 363 | | | |
| 6 | | | | 396 | ** | 173 | <95 | * | *** | 307 | 132 | 39 | | |
| 7 | | | | | | | <95 | * | | | 373 | | | |
| 8 | 156 | 90 | 47 | 115 | 348 | 343 | | 78 | | | | | | |
| 9 | | | | | | | | 58 | | 701 | 152 | | | |
| 10 | | | | | 204 | 252 | | 54 | * | | | | | |
| 12 | 107 | 62 | | 79 | | | | | | 317 | 113 | | | |
| 15 | | | | | | | | | 1280 | 231 | <117 | | | |
| 16 | 86 | | | 65 | | | | | | | | | | |
| 19 | | | | | | | | | 474 | | | | | |
| 20 | | | | | | | | | | 167 | | | | |
| 22 | | | | | | | | | 370 | | | | | |
| 25 | | | | | | | | | 345 | | | | | |
| 30 | | | | | | | | | 207 | | | | | |
| 35 | | | | | | | | | 180 | | | | | |
| 39 | | | | | | | | | 190 | | | | | |

Note
*a gel did not form in 24 hours
**a gel did not form in 72 hour
***a gel did not form in 120 hours
[1]The quantity of initiator I-86 employed at 150, 160 and 170° F. is expressed grams From Table VI it can be seen that gel time decreases as quantity of initiator increases. This relationship is introducing into said formation a polymerizable monomer consisting essentially of at least one water soluble hydroxy unsaturated carbonyl together with a suitable initiator and permitting said carbonyl to polymerize and crosslink in said formation to thereby decrease the rate of flow of water from said formation.

2. The method of claim 1 wherein said hydroxy unsaturated carbonyl is a self crosslinking monomer represented by the general formula $$CH_2=C-C=O \quad (1)$$
$$\phantom{CH_2=}|\phantom{-C=}|$$
$$\phantom{CH_2=}R_2\phantom{-}R_1$$
$$\phantom{CH_2=C-}|$$
$$\phantom{CH_2=C-}(CH_2)_a$$
$$\phantom{CH_2=C-}|$$
$$\phantom{CH_2=C-}OH$$

wherein $R_1$ is —O— or $$-\underset{H}{\underset{|}{N}}-,$$

$R_2$ is hydrogen or —$CH_3$, and a is 1 or 2.

3. The method of claim 2 wherein said monomer is introduced into said formation in undiluted form or in an aqueous solution consisting of at least about 2 pounds of said monomer per 100 pounds of said aqueous solution.

4. The method of claim 3 wherein the concentration of said initiator introduced into said formation together with said monomer is an amount in the range of from about 0.001 to about 2.0 percent initiator by weight of said aqueous solution.

5. The method of claim 4 wherein said initiator is an azo compound represented by the general formula $$Z-N=N-B \quad (2)$$

wherein:
Z is $$A-\underset{R_1}{\underset{|}{\overset{CH_3}{\overset{|}{C}}}}-;$$

B is Z or $R_2$;
$R_1$ is —$CH_3$ or —C≡N;
A is $$-C\underset{R_4}{\overset{R_3}{\lessgtr}}, \text{ +}(CH_2)_2COOH \text{ or } -CH_3;$$

$R_2$ is $$-C\underset{NH_2}{\overset{O}{\lessgtr}}$$

$R_3$ is =N—, =NH or =O; and
$R_4$ is $$-\overset{|}{N}H;$$

—$NH(CH_2)_2OH$, —$NHC(CH_2OH)_2CH_3$ or —$NHC(CH_2OH)_3$;

when $R_3$ is =N—, then $R_4$ is $$-\overset{|}{N}H;$$

and
when B is $R_2$, then $R_1$ is —C≡N and
A is —$CH_3$.

6. The method of claim 5 wherein B is Z.

7. The method of claim 6 wherein said monomer is present in said aqueous solution in an amount in the range of from about 5 to about 20 pounds of said monomer per 100 pounds of said aqueous solution.

8. The method of claim 7 wherein the concentration of said initiator is an amount in the range of from about 0.01 to about 1.0 percent initiator by weight of said aqueous solution.

9. The method of claim 3 wherein said monomer is introduced into said formation in an aqueous solution wherein said monomer is present in said aqueous solution in an amount in the range of from about 5 to about 20 pounds of said monomer per 100 pounds of said aqueous solution.

10. The method of claim 9 wherein said monomer is present in said aqueous solution in an amount in the range of from about 10 to about 15 pounds of said monomer per 100 pounds of said aqueous solution.

11. The method of claim 10 wherein the concentration of said initiator introduced into said formation together with said monomer is an amount in the range of from about 0.05 to about 0.5 percent initiator by weight of said aqueous solution.

12. The method of claim 9 wherein the concentration of said initiator introduced into said formation together with said monomer is an amount in the range of from about 0.01 to about 1.0 percent initiator by weight of said aqueous solution.

13. The method of claim 2 wherein $R_1$ is $$-\underset{H}{\underset{|}{N}}-.$$

14. The method of claim 2 wherein $R_1$ is —O—.

15. The method of claim 15 wherein $R_2$ is hydrogen and a is 2.

16. The method of claim 1 wherein said hydroxy unsaturated carbonyl is a compound selected from the group consisting of hydroxyethylacrylate, N-hydroxymethylacrylamide, N-hydroxymethyl methacrylamide, hydroxyethylmethacrylate, hydroxymethylacrylate, hydroxymethylmethacrylate, N-hydroxyethylacrylamide, and N-hydroxyethylmethacrylamide.

17. The method of claim 16 wherein said initiator is selected from the group consisting of 2,2'-Azobis(N,N'-dimethylene isobutyramidine)dihydrochloride, 2,2'-Azobis(2-amidinopropane) dihydrochloride and 2,2'-Azobis[2-methyl-N-(2-hydroxethyl)propionamide].

18. The method of claim 17 wherein said carbonyl is selected from the group consisting of N-hydroxymethylacrylamide, hydroxyethylacrylate, hydroxyethylmethacrylate and N-hydroxymethylmethacrylamide.

19. The method of claim 18 wherein said carbonyl is hydroxyethylacrylate.

* * * * *